(12) United States Patent
Lewin et al.

(10) Patent No.: US 6,326,059 B1
(45) Date of Patent: Dec. 4, 2001

(54) TWO-STAGE CURE COATING COMPOSITIONS

(75) Inventors: Laura Ann Lewin, Greenville; Christopher Scopazzi, Wilmington, both of DE (US); Douglas Matt Lamb, Lansdale, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/633,765

(22) Filed: Aug. 7, 2000

(51) Int. Cl.$^7$ ...................................................... B05D 3/02
(52) U.S. Cl. ......................................... 427/379; 427/385.5
(58) Field of Search ................................... 427/379, 385.5

(56) References Cited

U.S. PATENT DOCUMENTS

| | | |
|---|---|---|
| 3,716,599 | 2/1973 | Vasta . |
| 3,880,796 | 4/1975 | Christenson et al. . |
| 3,954,588 | 5/1976 | Hazan et al. . |
| 4,020,216 | 4/1977 | Miller . |
| 4,167,499 | 9/1979 | Hazan . |
| 4,293,661 | 10/1981 | Probst et al. . |
| 4,308,121 | 12/1981 | Hazan . |
| 4,452,948 | 6/1984 | Marrion et al. . |
| 4,529,785 | 7/1985 | Ohmori et al. . |
| 4,547,556 | 10/1985 | Hughes et al. . |
| 4,560,728 | 12/1985 | Lewarchik et al. . |
| 4,588,781 | 5/1986 | Ohmori et al. . |
| 4,622,348 | 11/1986 | Jacobine et al. . |
| 4,622,364 | 11/1986 | Ohmori et al. . |
| 4,634,738 | 1/1987 | Santer . |
| 4,659,799 | 4/1987 | Nahas et al. . |
| 4,680,352 | 7/1987 | Janowicz et al. . |
| 4,692,503 | 9/1987 | Das et al. . |
| 4,713,265 | 12/1987 | Nahas et al. . |
| 4,909,915 | 3/1990 | Bederke et al. . |
| 4,983,676 | 1/1991 | Petrie et al. . |
| 4,987,177 | 1/1991 | Den Hartog et al. . |
| 5,021,502 | 6/1991 | Patzschke et al. . |
| 5,116,930 | 5/1992 | Yabuta et al. . |
| 5,177,122 | 1/1993 | Shih . |
| 5,212,242 | 5/1993 | Gross et al. . |
| 5,276,097 | 1/1994 | Hoffmann et al. . |
| 5,290,633 | 3/1994 | Devlin et al. . |
| 5,326,820 | 7/1994 | Hoffmann et al. . |
| 5,391,620 | 2/1995 | Bederke et al. . |
| 5,415,750 | 5/1995 | Klein et al. . |
| 5,424,369 | 6/1995 | Yukawa et al. . |
| 5,426,156 | 6/1995 | Bederke et al. . |
| 5,633,307 | 5/1997 | Das et al. . |
| 5,659,136 | 8/1997 | Koch et al. . |
| 5,681,906 | 10/1997 | Yezrielev et al. . |
| 5,744,542 | 4/1998 | Martz et al. . |
| 5,763,528 * | 6/1998 | Barsotti et al. ...................... 525/63 |
| 5,859,136 | 1/1999 | Scopazzi et al. . |

FOREIGN PATENT DOCUMENTS

| | | |
|---|---|---|
| 0 242 513 A1 | 10/1987 | (EP) . |
| 0 483 915 A1 | 6/1992 | (EP) . |
| 74/49013851 B4 | 4/1974 | (JP) . |
| 76/51049226 A2 | 4/1976 | (JP) . |
| 82/57051773 A2 | 3/1982 | (JP) . |
| 83/58065763 A2 | 4/1983 | (JP) . |
| WO89/02452 A1 | 3/1989 | (JP) . |
| 92/04114069 A | 4/1992 | (JP) . |
| 93/05239403 A2 | 9/1993 | (JP) . |
| 94/06287511 A2 | 10/1994 | (JP) . |
| 95/07138491 A2 | 5/1995 | (JP) . |
| 96/08252526 A2 | 10/1996 | (JP) . |
| WO93/17368 | 9/1993 | (WO) . |
| WO98/02494 A1 | 1/1998 | (WO) . |
| WO 99/23131 * | 5/1999 | (WO) . |

OTHER PUBLICATIONS

Kovacs et al., Accelerated Film Development by Acrylate/isocyanate Copolymer Containing Hydroxy Groups, Budalakk Paint Synth. Resin work, Buadpest, Hungary, (1974), 28(9), 412–13.

Lavenith, L., Rapid Curing Polyurethane Coatings, Paint Manufacture, (1968) 38(12):33–8.

Bartels et al., Fast Curing Resins Based on Oxazolidines, Advances in Organic Coatings Science and Technology Series, vol. 10 (1986) 18–22.

Yukawa et al., Self–Crosslinkable Graft copolymer with Blocked Isocyanate and Other Functionalities: The Synthesis, Reactivity and Application to Thermoset Coatings, XIX International Conerence n Organic Coatings Science and Technology (1993) 459–88.

* cited by examiner

Primary Examiner—Erma Cameron
(74) Attorney, Agent, or Firm—Sudhir G. Deshmukh

(57) ABSTRACT

This invention provides for a two-pack solvent based coating composition that cures in two stages when applied over substrates. The first stage of the cure takes place rapidly under ambient conditions to produce a coating surface that can be readily sanded or buffed. Thereafter, over a period of days a second stage cure takes place to produce a coating having excellent coating properties. Thus, a coated component, such as automotive body, can be speedily moved out from a spray booth without affecting the surface quality of the coated surface. As a result, coating operation productivity can be increased. The aforedescribed dual cure properties of the coating composition result from including in a binder component of the coating composition an acrylic polymer having secondary amine and hydroxyl functionalities. The composition is most suited for use in automotive refinish applications.

3 Claims, No Drawings

TWO-STAGE CURE COATING COMPOSITIONS

FIELD OF INVENTION

This invention generally relates to two-pack coating compositions used in automotive coating applications, particularly in automotive refinish applications. More particularly, this invention relates to a coating composition that cures in two stages under ambient or low bake conditions.

BACKGROUND OF THE INVENTION

Solvent-based coating compositions generally include a binder polymer and a crosslinking agent, which cross link upon application to produce coatings having excellent coating properties. One problem associated with such coating compositions is the relatively longer time required to cure these compositions. Such longer cure times cut down the productivity in automotive refinish shops by requiring the automobile or truck to remain for a longer period of time in the area in which it was spray coated. A rapid initial cure is thus desirable to produce a coating that can be readily sanded or buffed without fouling sandpaper. Such a rapid initial cure permits the user to readily remove coated automobile or trucks bodies out of the spray booths and allow them to fully cure at other convenient locations. As a result, productivity of coating autobodies can be improved substantially.

Attempts have been made to decrease the curing time of these two pack-coating compositions by using more reactive components or catalysts. However, while the use of such components decreases curing time, the higher reactivity of such components usually reduces the time to gelation or pot life of the coating composition as well. In the most extreme case, instant gelation of the composition can occur when, for example, the polyisocyanate is mixed with a polymer having reactive amine groups. Thus, a need still exists for a two-pack coating composition that cures rapidly while still having an acceptable pot life.

Attempts have been made to provide for a coating composition that cures rapidly after application. A commonly assigned U.S. Pat. No. 5,859,136 discloses a coating composition containing a dispersed core-shell acrylic polymer having a core polymerized from ethylenically unsaturated monomers containing amine functional groups. These amine groups positioned in the core are not readily available to react with the crosslinking agent, such as an isocyanate, which has to penetrate the shell to reach the core to crosslink with amine functionality. Applicants have come up with a novel alternate approach to reduce the cure time of the coating composition while still providing acceptable pot life and coating properties.

SUMMARY OF THE INVENTION

The present invention is directed to a two-stage cure coating composition comprising a binder and a crosslinking component, said binder component comprising an acrylic polymer having in the range of from 5.0 weight percent to 70.0 weight percent of hydroxyl moieties and in the range of from 0.5 weight percent to 8.0 weight percent of secondary amine moieties, all percentages based on the weight of binder component solids; and said crosslinking component comprising a crosslinking agent having at least two isocyanate groups.

The present invention is also directed to a method of producing a coating on a substrate, said method comprising:

mixing a binder component and a crosslinking component of a two-stage cure coating composition to form a pot mix, wherein said binder component comprises an acrylic polymer having in the range of from 5.0 weight percent to 70.0 weight percent of hydroxyl moieties and in the range of from 0.5 weight percent to 8.0 weight percent of secondary amine moieties, all percentages based on the weight of binder component solids; and wherein said crosslinking component comprises a crosslinking agent having at least two isocyanate groups;

applying a layer of said pot mix over said substrate;

first stage curing said layer, wherein said layer has a Persoz hardness of at least 30 within 2 hours after said application;

second stage curing said first stage cured layer into said coating on said substrate.

One of the advantages of the coating composition of the present invention is that a coating resulting therefrom has rapid first stage cured state (defined below) obtained under ambient conditions when compared against the coatings obtained from conventional coating compositions.

Another advantage of the present invention is that a coating resulting therefrom still provides excellent second stage cured state (defined below) necessary to achieve desired long term coating properties, such as etch and mar resistance.

Still another advantage of the present invention is that it requires substantially low amounts of solvent needed for efficient spray application, thus enabling the formulator, especially in the United States, to meet the increasingly stringent legal requirements that deal with the acceptable level of release of VOC (volatile organic content) in the atmosphere.

Still another advantage of the coating composition of the present invention is its extended pot life as compared to conventional rapid curing coating compositions.

The novel coating composition of the present invention also advantageously permits a formulator to select from a wider selection of other film forming polymers that can be incorporated in the coating composition.

DETAILED DESCRIPTION OF THE INVENTION

As defined herein:

"Two-pack coating composition" means a thermoset coating composition comprising two components stored in separate containers. These containers are typically sealed to increase the shelf life of the components of the coating composition. The components are mixed prior to use to form a pot mix. The pot mix has a limited pot life typically of minutes (about 30 minutes to 60 minutes) to a few hours (1 hour to 2 hours). The pot mix is applied as a layer, typically through a spray nozzle, of desired thickness on a substrate surface, such as an autobody. After application, the layer is cured under ambient conditions or bake cured at elevated temperatures to form a coating on the substrate surface having desired coating properties, such as high gloss, mar-resistance and resistance to environmental etching.

"GPC weight average molecular weight" and "GPC number average molecular weight" means a weight average molecular weight (Mw) and a number average molecular weight (Mn), respectively measured by utilizing gel permeation chromatography. A high performance liquid chromatograph (HPLC) supplied by Hewlett-Packard; Palo Alto, Calif. was used. Unless stated otherwise, tetrahydrofuran was used as the liquid phase and polystyrene was used as the standard.

"Polydispersity" of a polymer is a ratio of Mw to Mn.

"(Meth)acrylate" means methacrylate and acrylate.

"Polymer solids" or "composition solids" means a polymer or composition in its dry state.

"First stage cure" under ambient conditions occurs when a layer of a coating composition upon application cures sufficiently within a very short duration of less than two hours to produce a surface that can be readily buffed or sanded without fouling the sanding paper. Such a first stage cured layer generally has a Persoz hardness of about 30 or more, preferably about 35 or more and most preferably in the range of about 40 to about 100. The procedure used for determining the Persoz hardness is described in the Examples section below.

"Second stage cure" of the first stage cured layer under ambient conditions occurs within several days (generally about 2 days to about 10 days) to produce a fully cured coating that is tough and hard and has the desired coating properties, such as etch and mar resistance. If desired, the second cure time can be shortened to about 12 hours to 48 hours by bake curing it for about 60 to 15 minutes at about 60° C. to 80° C.

The novel composition of this invention has an excellent pot life of about 1 to 2 hours. A layer from the novel composition of this invention dries rapidly to the first stage cure at ambient temperatures. Thereafter, within a few days, the first stage cured layer fully cures (the second stage cure) at ambient temperatures to produce a hard tough coating. This is particularly advantageous in refinishing automobiles and trucks. For example, in repairing a clear coat/color coat finish of an automobile or truck, generally the color coat is applied and dried for a short time but not cured and then the clear coat is applied and both coats are cured, all at ambient temperatures. If necessary, the cured clear coat is sanded and buffed to improve appearance and remove minor imperfections. For a clear finish to be sandable and buffable, it must be hard but not tough. Since, the coating composition of this invention has a short first stage cure time; the rate of processing vehicles through a typical repair facility can be substantially increased. Thus, the vehicle can be moved out of the spray booth area to provide room for another vehicle to be painted. Similarly, if the present composition is used as a primer, it can be sanded in a short period of time after application and a topcoat can then be applied on top of the sanded surface.

These advantages of the novel composition are the result of having a reactive functional group in the acrylic polymer utilized in the composition. However, since the secondary amine group is highly reactive, a coating composition containing such reactive groups has unacceptably short pot life. Applicants have discovered that by utilizing a certain amount of such short acting reactive groups, for example, amine moieties in the polymer, it becomes possible to produce a coating composition that has an acceptable pot life and still produce coatings having an acceptable first stage cure time. However, such a coating composition in and of itself would not produce coatings having desirable coating properties. Applicants elegantly addressed that problem by providing long acting reactive groups, such as hydroxyl moieties, in a polymer of certain molecular weight and glass transition temperature. Thus, after the dual cure coating composition of the present invention is applied over a substrate and after solvent evaporates during the drying process, the short acting moieties in the polymer become available to rapidly react with the crosslinking agent and form a crosslinked finish that is tack free in a short period. The long acting reactive groups in the polymer thereafter react with the crosslinking agent to attain second stage cure in a relatively short time at ambient temperatures to produce a coating having hard durable finish and excellent coating properties.

The coating composition of the present invention is a two-pack coating composition that includes a binder component and a crosslinking component. These components are stored separately, for example, in separate containers and are mixed just prior to use to form a pot mix. The coating composition generally includes in the range of 50 weight percent to 90 weight percent of the binder component and includes in the range of 10 weight percent to 50 weight percent of the crosslinking component, all percentages being based on the composition solids.

The binder component includes in the range of 30 weight percent to 90 weight percent, preferably in the range of 40 weight percent to 80 weight percent, and more preferably in the range of 50 weight percent to 70 weight percent of an acrylic polymer, all percentages being based on the binder component solids.

Applicants have unexpectedly discovered that by providing an acrylic polymer with a certain number of pendant secondary amine moieties, rapid first stage cure can be attained. However, since the reactivity of the secondary amine with a typical crosslinking agent, such as polyisocyanate, is extremely fast, applicants have unexpectedly discovered that by adding just a small amount of a secondary amine monomer during acrylic polymer polymerization, the first stage cure time can be dramatically reduced from 4 to 8 hours to about 2 hours without any significant attenuation in the pot life.

The foregoing result was quite unexpected and it was attained by including in the binder component an acrylic polymer having in the range of from 0.5 weight percent to 8.0 weight percent, preferably in the range of 0.75 weight percent to 6.0 weight percent, and more preferably in the range of 1.0 weight percent to 5.0 weight percent of secondary amine moieties, all percentages based on the weight of binder component solids. If the amount of the secondary amine moieties used exceeds the foregoing upper limit, the pot mix becomes too viscous to be of any practical spray application, if the amount of the secondary amine moieties used is less than the foregoing lower limit, no significant improvement in the first stage cure takes place.

The secondary moieties can be derived from polymerizing the acrylic polymer monomer from one or more suitable secondary amine monomers. For example tert-butyl aminoethyl (meth)acrylate. Tert-butyl aminoethyl methacrylate is preferred. Alternatively, the secondary amine functionality may be introduced by post reacting a polymer containing glycidyl (meth)acrylate with a primary amine or an alkanol amine having primary amine groups. Suitable primary amines include propyl amine, butyl amine, hexyl amine, octyl amine and benzyl amine. Suitable alkanol amines include ethanol amine, propanol amine, butanol amine and methyl ethanol amine.

Applicants also discovered that though the presence of the secondary amine moieties substantially reduces the first stage cure time, some other means are needed to attain a desired degree of second stage cure, which is essential for a high quality coating. Applicants unexpectedly discovered that by providing the acrylic polymer with dual functionalities, desired second stage cure could be attained without sacrificing the fast first stage cure or without any significant decrease in the pot life. Applicants attained the foregoing results by providing the acrylic polymer with a certain number of pendant hydroxyl moieties in addition to the aforedescribed secondary amine moieties. Thus, the acrylic polymer further includes in the range of 5.0 weight percent to 70.0 weight percent, preferably in the range of 10.0 weight percent to 40.0 weight percent, and more preferably in the range of 15.0 weight percent to 30.0 weight percent of hydroxyl moieties, all percentages based on the weight of the binder component solids. If the amount of the hydroxyl moieties used exceeds the foregoing upper limit, the resultant coating will tend to crack, if the amount of the hydroxyl moieties used is less than the foregoing lower limit, the resultant coating will have a tacky feel to it.

Preferred hydroxy moieties are derived from hydroxy monomers, such as hydroxy alkyl (meth)acrylates wherein the alkyl group has in the range of 1 to 4 carbon atoms in the alkyl group. Exemplars include hydroxy ethyl (meth) acrylate, hydroxy propyl (meth)acrylate, hydroxy butyl (metha)crylate or a combination thereof. Hydroxy ethyl methacrylate is preferred The monomer mixture will include other suitable monomers, such as, styrene, alkyl styrene; vinyl toluene; acrylonitrile; alkyl (meth)acrylates having 1–18 carbon atoms in the alkyl group, such as methyl (meth)acrylate, ethyl (meth)acrylate, propyl (meth)acrylate, isopropyl (meth)acrylate, butyl (meth)acrylate, pentyl (meth)acrylate, hexyl (meth)acrylate, 2-ethyl hexyl (meth)acrylate, nonyl (meth)acrylate, lauryl (meth)acrylate, stearyl (meth) acrylate; cycloaliphatic (meth)acrylates, such as trimethyl-cyclohexyl (meth)acrylate, and isobutylcyclohexyl (meth) acrylate; aryl (meth)crylates, such as benzyl (meth)acrylate; isobornyl (meth)acrylate; cyclohexyl (meth)acrylate; glycidyl (meth)acrylate, ethyl hexyl (meth)acrylate, benzyl (meth)acrylate or a combination thereof. Methcraylates of methyl, butyl, n-butyl, and isobornyl are preferred.

The acrylic polymer suitable for use may be a linear polymer, a branched polymer, a core-shell polymer, or a combination thereof. The linear acrylic polymer is preferred. Applicants also unexpectedly discovered that to attain the aforedescribed application productivity advantages, the acrylic polymer preferably has a molecular weight and a Tg in a certain range. Thus, the acrylic polymer which may be a linear or branched acrylic polymer has a weight average molecular weight (Mw) varying in the range of from 1,000 to 30,000, preferably varying in the range of from 1,500 to 20,000, more preferably varying in the range of from 2000 to 15,000 and a Tg varying in the range of from of –20° C. to 100° C., preferably varying in the range of from 0° C. to 90° C., and more preferably varying in the range of from 20° C. to 80° C.

The linear acrylic polymer may be produced by conventional processes well known in the art. Typically, solvent is added to a reactor and brought to reflex at elevated temperatures under a nitrogen blanket. Optionally, before adding heat, the reactor may be fed with a portion of the monomer mixture and one or more typical initiator, such as the azo type catalysts, which include 2,2'-azobis (2,4 dimethylpentane nitrile); peroxides, such as di-tertiarybutyl peroxide; and hydroperoxides. Commercially available peroxy type initiator t-butylperoxide or Triganox® B from AKZO NOBEL is suitable for use in the present invention. Upon attaining the desired polymerization temperature, the initiator and the monomer mixture are simultaneously fed to the reactor over a period of time. Optionally, a shot of secondary amine monomer may be added towards the end of polymerization. Sometimes, it is also desirable to add additional initiator upon completion of addition of the monomer mixture to ensure completion of the polymerization process.

The branched acrylic polymer can be produced by a polymerization process, described in U.S. Pat. Nos. 4,680, 352 and 5,290,633, which are incorporated herein by reference. Typically, the branched polymers are made in two stages. In the first stage, macromonomers, using conventional cobalt (II) or (III) chelate chain transfer agent, are produced to ensure that the macromonomer is provided with one terminal ethylenically unsaturated group, which is polymerizable. During the second stage, the monomer mixture described earlier is added to the reactor containing the macromonomers. The monomers polymerize with the ethylenically unsaturated group on the macromonomer to produce the branched acrylic polymer.

The core-shell polymer has a solvent insoluble core, and a solvent soluble shell, chemically attached to the core. Preferably, the shell is in the form of macromonomer chains or arms attached to it. The core-shell polymer is a polymer particle dispersed in an organic media, wherein the polymer particle is stabilized by what is known as steric stabilization. The average particle size of the core ranges from 0.1 to 1.0 microns, preferably from 0.15 to 0.6, more preferably from 0.15 to 0.6.

The core-shell polymer includes in the range of from about 10 percent to 90 percent, preferably in the range of from 50 percent to 80 percent all in weight percent based on the weight of the dispersed polymer, of a core formed from high molecular weight polymer having a weight average molecular weight of about 50,000 to 500,000, preferably in the range of from 50,000 to 200,000, more preferably in the range of from 50,000 to 150,000. The arms make up about 10 percent to 90 percent, preferably 20 percent to 50 percent, all in weight percent based on the weight of the core-shell polymer. The arms are formed from a low molecular weight polymer having weight average molecular weight in the range of from about 1,000 to 50,000, preferably in the range of from 2000 to 40,000, more preferably in the range of from 3000 to 30,000.

The core of the dispersed core-shell polymer is comprised of one or more polymerized acrylic monomers. Suitable monomers include styrene, alkyl (meth)acrylate having alkyl carbon atoms in the range of from 1 to 18, preferably in the range of from 1 to 12; ethylenically unsaturated monocarboxylic acid, such as, (meth)acrylic acid, silane-containing monomers, and epoxy containing monomers, such as glycidyl (meth)acrylate. Other optional monomers include amine containing monomers, hydroxyalkyl (meth) acrylate or acrylonitrile. Optionally, the core may be crosslinked through the use of diacrylates or dimethacrylates, such as, allyl methacrylate or through post reaction of hydroxyl moieties with polyfunctional isocyanates or carboxylic moieties with epoxy moieties.

The macromonomer arms attached to the core are polymerized from the hydroxyl and secondary amine monomers, described earlier. In addition, the arms may be polymerized from monomers, such as styrene and alkyl (meth)acrylates having 1 to 12 carbon atoms.

The process for making the core-shell polymer is described in U.S. Pat. No. 5,659,136, which is incorporated herein by reference.

The crosslinking component of the coating composition of the present invention includes one or more crosslinking agents having at least two isocyanate groups, such as a polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane and 4,4'-diisocyanatodiphenyl ether.

Typical trifunctional isocyanates include triphenylmethane triisocyanate, 1,3,5-benzene triisocyanate and 2,4,6-toluene triisocyanate. Trimers of diisocyanates also can be used, such as the trimer of hexamethylene diisocyanate, which is supplied by Bayer Corporation, Pittsburgh, Pa., under the trademark Desmodur® N-3390. Other suitable polyisocyanates from Bayer Corporation include Desmodur® N-3300, and Z-4470BA polyisocyanates.

The relative amount of crosslinking agent used in the coating composition is adjusted to provide a molar equivalent ratio of NCO/(OH+NH) in the range of from 0.5 to 2, preferably in the range of from 0.75 to 1.5 and more preferably in the range of from 0.85 to 1.25.

The coating composition preferably includes one or more catalysts to enhance crosslinking of the components during curing. Generally, the coating composition includes in the range of from 0.005 percent to 2 percent, preferably in the range of from 0.01 to 1 percent and more preferably in the range of from 0.02 percent to 0.7 percent of the catalyst, the percentages being in weight percentages based on the total weight of the binder and crosslinking component solids. These catalysts are preferably added to the binder component.

Applicants also discovered that the pot life of the coating composition containing the aforedescribed catalyst can be extended by adding in the range of from 0.1 weight percent to 2.0 weight percent, preferably in the range of from 0.15 weight percent to 1.0 weight percent and more preferably in the range of from 0.2 weight percent to 0.5 weight percent a pot life extending agent.

One of the suitable pot life-extending agents is carboxylic acid, such as acetic acid, propionic acid, butyric acid, lauric acid. Acetic acid is preferred.

If desired, the binder component of the coating composition may also include one or more oligomers having a weight average molecular weight (Mw) in the range of from 100 to 2000, preferably in the range from 500 to 1500, a polydispersity in the range of from 1.01 to 1.7, preferably in the range of from 1.05 to 1.5 and more preferably in the range from 1.1 to 1.3, and having one or more isocyanate reactive functionalities. The oligomer preferably includes in the range from 2 to 12, more preferably in the range from 2 to 8 and most preferably in the range from 2 to 6 isocyanate reactive functionalities. The suitable isocyanate reactive functionalities include a hydroxyl group, epoxy group or a combination thereof.

The oligomer can be produced by first reacting a multifunctional alcohol, such as, pentaerythritol, hexandiol, trimethyol propane with alicyclic monomeric anhydrides, for example, hexahydrophthalic anhydride or methylhexahydrophthalic anhydride to produce an oligomeric acid. Oligomeric acids having at least one hydroxyl functionality are also suitable, prepared by reacting the multifunctional alcohol with less than a stochiometric amount of the monomeric anhydride.

The oligomeric acid is then reacted with a monofunctional epoxy under pressure at a reaction temperature in the range of from 60° C. to 200° C. Typical reaction time is in the range of from 1 hours to 24 hours, preferably 1 hour to 4 hours. The foregoing two-step process ensures that the hydroxyl functionalities are uniformly distributed on each oligomeric chain of the reactive oligomer to produce the reactive oligomers with the polydispersity in the range described earlier. The monofunctional epoxy suitable for use in the present invention include alkylene oxide of 2 to 12 carbon atoms, ethylene, propylene and butylene oxides are preferred, ethylene oxide is more preferred. Other epoxies, such as, Cardura® E-10 glycidyl ester, supplied by Exxon Chemicals, Houston, Tex. may be used in conjunction with the monofunctional epoxies, described above. The details of producing the oligomer are described in a PCT Publication WO 99/23131, which was published on May 14, 1999. Said publication is incorporated herein by reference.

If desired, the coating composition may include an acrylic resin, polyester or a combination thereof.

The polyester has at least one or more of the aforedescribed isocyanate reactive functionalities, a weight average molecular weight (Mw) varying in the range of from 2000 to 20,000, preferably varying in the range of from 3000 to 10,000 and a Tg varying in the range of from of −20° C. to 1 00° C., preferably varying in the range of from 0° C. to 90° C., and more preferably varying in the range of from 20° C. to 80° C.

The polyester suitable for use in the present invention may be any conventional polyester conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form or a mixture thereof. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols. The details of polyester suitable for use in the present invention are further provided in the U.S. Pat. No. 5,326,820, which is incorporated herein by reference. One example of the commercially available polyester suitable for use is SCD® -1040 polyester, which is supplied by Etna Product Inc., Chagrin Falls, Ohio.

The acrylic resin has at least one or more of the aforedescribed isocyanate reactive functionalities, a weight average molecular weight (Mw) varying in the range of from 1,000 to 30,000, preferably varying in the range of from 1,500 to 20,000, more preferably varying in the range of from 2000 to 15,000 and a Tg varying in the range of from of −20° C. to 100° C., preferably varying in the range of from 0° C. to 90° C., and more preferably varying in the range of from 20° C. to 80° C.

The aforedescribed acrylic resin may be conventionally prepared in accordance with the process disclosed in the U.S. Pat. No. 5,286,782, which is incorporated herein by reference.

Some of the suitable solvents include aromatic hydrocarbons, such as petroleum naphtha or xylenes; esters, such as, butyl acetate, t-butyl acetate, isobutyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both the components of the coating composition.

The amount of solvent added to the coating composition may be adjusted to provide the composition with a VOC (volatile organic content) in the range of from 0.12 kilograms (1.0 pounds per gallon) to 0.78 kilograms (6.5 pounds per gallon) of the solvent per liter of the coating composition.

The coating composition of the present invention may also contain conventional additives, such as stabilizers, and rheology control agents, flow agents, and toughening agents. Such additional additives will, of course, depend on the intended use of the coating composition. Any additives that would adversely effect the clarity of the cured coating will not be included when the composition is used as a clear coating. The foregoing additives may be added to either component or both, depending upon the intended use of the coating composition.

To improve weatherability of the coating, 0.1 to 5 weight percent, preferably 0.5 to 2.5 weight percent and more preferably 1 to 2 weight percent of ultraviolet light stabilizers screeners, quenchers and antioxidants can be added to the composition, the percentages being based on the total weight of the binder and crosslinking components solids. Typical ultraviolet light screeners and stabilizers include the following:

Benzophenones, such as hydroxy dodecycloxy benzophenone, 2,4-dihydroxy benzophenone, and hydroxy benzophenones containing sulfonic acid groups.

Benzoates, such as dibenzoate of diphenylol propane and tertiary butyl benzoate of diphenylol propane.

Triazines, such as 3,5-dialkyl-4-hydroxyphenyl derivatives of triazine and sulfur containing derivatives of dialkyl-4-hydroxy phenyl triazine, hydroxy phenyl-1,3,5-triazine Triazoles, such as 2-phenyl-4-(2,2'-dihydroxy benzoyl)-triazole and substituted benzotriazoles, such as hydroxyphenyltriazole.

Hindered amines, such as bis( 1,2,2,6,6 entamethyl-4-piperidinyl sebacate) and di[4(2,2,6,6, tetramethyl piperidinyl)]sebacate; and any mixtures of any of the above.

In use, the first-pack of the two-pack coating composition containing the binder component and the second-pack containing the crosslinking component are mixed just prior to use or about 5 to 30 minutes before use to form a pot mix. A layer of the pot mix is typically applied to a substrate by conventional techniques, such as spraying, electrostatic spraying, roller coating, dipping or brushing. Generally, a layer having a thickness in the range of from 25 micrometers to 75 micrometers is applied over a metal substrate, such as automotive body, which is often pre-coated with other coating layers, such as an electrocoat, primer and a basecoat.

In applying the clear coating composition to a vehicle such as an automobile or a truck for a repair or repainting, the basecoat which may be either a solvent based composition or a waterborne composition is first applied and then dried to at least remove solvent or water before the clear coat is applied usually by conventional spraying. Electrostatic spraying also may be used. The clear coat is dried at ambient temperatures but moderately higher temperatures of up to about 80° C. can be used. As soon as the clear finish is dust free and tack free the vehicle can be moved from the work area to allow for the refinishing of another vehicle.

Generally, within about 2 hours after application, the layer from the pot mix of the coating composition cures to the first stage, i.e., it is sufficiently cured to allow for buffing and polishing, if needed, to remove imperfections and improve gloss of the finish. The first stage cured layer continues to cure and after several days, it reaches a level of hardness and toughness required for a durable and weatherable automotive finish, i.e., the coating reaches the second stage cured state.

The coating composition of the present invention is suitable for use as a clear or pigmented composition. The composition can be pigmented with conventional pigments, including metallic flakes. The coating composition can be used as a monocoat or as a basecoat or as a primer.

The coating composition of the present invention is suitable for providing coatings on a variety of substrates, such as metal, wood and concrete substrates and resinous surfaces, such as, for example, RIM (reaction injection molded) auto bumpers and dashboards. The present composition is suitable for providing clear or pigmented coatings in automotive OEM (original equipment manufacturer) applications and especially suitable for refinish applications typically used in making repairs and touch-ups to automotive bodies. Obviously, the coating composition is also well suited for use in other applications, such as coating truck bodies, boats, airplanes, tractors, cranes and other metal bodies. The coating composition of the present invention is also suitable for use in industrial and maintenance coating applications.

The following examples illustrate the invention.

Test Methods

Persoz hardness was determined by a GARDCO® Pendulum Hardness Tester model HA-5854 manufactured by BYK Chemie, Germany and sold by Paul N. Gardner Company, Inc. Pompano Beach, Fla. The tester has a digital counter and an LED indicator.

Swell Ratio

Freestanding films from coating compositions (removed from thermoplastic polyolefin substrates) were placed between two layers of aluminum foil and using a punch, discs of about 3.5 mm diameter were punched out from the films. The aluminum foil was removed from either side of the disc. Using a microscope with 10× magnification and a filar lens, the unswollen diameter ($D_o$) of the film disc was measured. Four drops of methylene chloride were added to the film, the film was allowed to swell for a few seconds and then a glass slide was placed over it and its diameter was measured again ($D_s$). The swell ratio was then calculated as:

Swell ratio=$(D_s)_2/(D_o)^2$

Gel Fractions

The gel fraction of free test films (removed from thermoplastic polyolefin substrates) was determined in boiling acetone. Approximately 0.5 gram of the test film was placed on a wire mesh screen. The screen containing the film was placed in acetone bath, boiled for 6 hours and then allowed to cool. The screen was removed from the acetone bath, dried overnight and then re-weighed. The reading was reported as:

Percent gel fraction=100 ×(weight of film after boiling/weight of film before boiling).

Thus, a percent gel fraction reading of 100 indicates complete crosslinking, i.e., none of the test film dissolved in acetone and a reading of 0 indicates that no crosslinking took place, i.e., all of the test film dissolved in acetone.

EXAMPLES

Example 1 (Comparative)

To a 5-liter flask fitted with a heating mantle, addition pumps and ports, agitator, water condenser, and thermocouple 717.5 g of butyl acetate solvent was added. The solvent was agitated and heated to a reflux temperature of 130° C. to 134° C. A monomer mixture of 440.2 g of styrene, 176.1 g of methyl methacrylate, 880.3 g isobutyl methacrylate, 264.1 g of hydroxyethyl methacrylate and 35.9 g of butyl acetate was simultaneously added to the flask via the addition pumps and ports with an initiator mixture of 53.8 g t-butyl peracetate and 466.1 g butyl acetate. The monomer mixture was fed over 210 minutes and the initiator mixture was fed over 300 minutes. The reaction temperature was held at reflux at 126° C. to 132° C. throughout the polymerization process. The reaction mixture was held at reflux for an additional 120 minutes, following the completion of the initiator mixture feed. After cooling the reaction mixture to less than 50° C., 466.2 g of acetone was added. The resulting polymer solution had weight solids of 52.5% and Brookfield viscosity of 460 cps (5 rpm). The number average molecular weight of the polymer was 7425 and the weight average molecular weight was 16806, as determined by gel permeation chromatography using polystyrene standard.

Example 2

To a 2-liter flask fitted with a heating mantle, addition pumps and ports, agitator, water condenser, and thermocouple 151.9 g of xylene and 101.3 g of toluene solvents were added. The solvent mixture was agitated and heated to a reflux temperature of 126° C. to 132° C. A monomer mixture of 155.4 g of styrene, 58.4 g of methyl methacrylate, 310.7 g isobutyl methacrylate, 97.0 g of hydroxyethyl methacrylate, 12.7 g of t-butyl aminoethyl methacrylate and 4.4 g of toluene was simultaneously added to the flask via the addition pumps and ports with an initiator mixture of 25.3 g Vazo® 88 initiator supplied by DuPont Company, Wilmington, Del., 106.3 g. of xylene and 75.3 g of toluene. The monomer mixture was fed over 180 minutes and the initiator mixture was fed over 300 minutes. The reaction temperature was held at reflux at 126° C. to 132° C. throughout the polymerization process. The reaction mixture was held at reflux for additional an 60 minutes, following the completion of the initiator mixture feed. After cooling the reaction mixture to less than 50° C., 101.3 g of acetone was added. The resulting polymer solution had weight solids of 54.1% and a Brookfield viscosity of 880 cps (5 rpm). The number average molecular weight of the polymer was 8051 and the weight average molecular weight was 15852, as determined by gel permeation chromatography using polystyrene standard.

Example 3

To a 2-liter flask fitted with a heating mantle, addition pumps and ports, agitator, water condenser, and thermocouple 125.1 g of xylene and 75.1 g of toluene solvents were added. The solvent mixture was agitated and heated to a reflux temperature of 126° C. to 130° C. A monomer mixture of 153.6 g of styrene, 50.1 g of methyl methacrylate, 183.2 g butyl methacrylate, 122.9 g of hydroxyethyl methacrylate, 25.0 g of glycidylmethacrylate, 92.2 g of isobornyl methacrylate and 4.4 g of toluene was simultaneously added to the flask via the addition pumps and ports with an initiator mixture of 31.3 g Vazo® 88 initiator supplied by the DuPont Company, Wilmington, Del., 130.1 g of xylene and 87 g of toluene. The monomer mixture was fed over 180 minutes and the initiator mixture was fed over 270 minutes. The reaction temperature was held at reflux at 126° C. to 132° C. throughout the polymerization process. The reaction mixture was held at reflux for additional 60 minutes, following the completion of the initiator mixture feed. After cooling the reaction mixture to less than 50° C., 7.5 g of ethanol amine and 12.5 g of toluene were added as a shot feed. After holding the reaction mixture for an additional 30 minutes at 50° C., 100.1 g of acetone was added. The resulting polymer solution had weight solids of 53.6% and Brookfield viscosity of 560 cps (5 rpm). The number average molecular weight of the polymer was 6654 and the weight average molecular weight was 16687, as determined by gel permeation chromatography using polystyrene standard.

Example 4

To a 5-liter flask fitted with a heating mantle, addition pumps and ports, agitator, water condenser, and thermocouple 367.3 g of xylene and 220.4 g of toluene solvents were added. The solvent mixture was agitated and heated to a reflux temperature of 126° C. to 132° C. A monomer mixture of 368 g of styrene, 184 g of methyl methacrylate, 423.2 g butyl methacrylate, 368 g of hydroxyethyl methacrylate, 36.7 g of t-butyl aminoethyl methacrylate, 368 g of isobornyl methacrylate and 12.9 g of toluene was simultaneously added to the flask via the addition pumps and ports with an initiator mixture of 91.8 g Vazo® 88 initiator supplied by the DuPont Company, Wilmington, Del., 382 g of xylene and 255.3 g of toluene. The monomer mixture was fed over 180 minutes and the initiator mixture was fed over 270 minutes. The reaction temperature was held at reflux at 126° C. to 132° C. throughout the polymerization process. The reaction mixture was held at reflux for additional an 60 minutes, following the completion of the initiator mixture feed. After cooling the reaction mixture to less than 50° C., 293.8 g of acetone was added. The resulting polymer solution had weight solids of 53.2% and a Brookfield viscosity of 480 cps (5 rpm). The number average molecular weight of the polymer was 5126 and weight average molecular weight was 9540, both as determined by gel permeation chromatography using polystyrene standard.

Example 5

To a 2-liter flask fitted with a heating mantle, addition pumps and ports, agitator, water condenser, and thermocouple 166.3 g of ethyl acetate, 101.4 g of butyl acetate and a portion of a monomer mixture (72 g) consisting of 211.2 g of 2-ethyl hexyl methacrylate, 105.6 g of isobornyl methacrylate, 274.6 g of butyl methacrylate, 42.2 g of t-butyl aminoethyl methacrylate and 15.9 g of ethyl acetate were added under agitation and heated to a reflux temperature of 89° C. to 93° C. To the flask 14.1 g of a 10% solution of bis(boron difluoro diphenyl glyoximato) cobaltate (II) in ethyl acetate and a portion of an initiator solution (16.5 g) consisting of 13.3 g of Vazo® 52 initiator supplied by the DuPont Company, Wilmington, Del. and 154.9 g of ethyl acetate were added as a shot. Thereafter, the remainders of the monomer mixture and the initiator solution were fed to the flask. The monomer mixture was fed over 180 minutes and the initiator mixture was fed over 330 minutes. The reaction temperature was held at reflux at 89° C. to 93° C. throughout the polymerization process. The reaction mixture was held at reflux for an additional 30 minutes, following the completion of the initiator mixture feed. A mixture of 0.3 g of t-butyl peroctoate, 22.5 g of ethyl acetate and 16.6 g of butyl acetate was then added as a shot and the reaction mixture held at reflux for an additional 30 minutes. Upon cooling, the reaction mixture to room temperature yielded a solution of polymer having weight solids of 57.8% and a Brookfield viscosity of 980 cps measured at 5 rpm using spindle number 3. The number average molecular weight of the resulting polymer was 4369 and weight average molecular weight was 8055, both as determined by gel permeation chromatography using polystyrene as standard.

Example 6

To a 2-liter flask fitted with a heating mantle, addition pumps and ports, agitator, water condenser, and thermocouple 436.1 g of macromonomer, 86.7 g of mineral spirits, 229.8 g of heptane, 7.6 g of ethyl acetate and 0.01 g of dimethyl athanol amine were fed under agitation and heated to a reflux temperature of 89C to 93° C. A monomer mixture of 58.7 g of styrene, 163.6 g of methyl methacrylate, 73.9 g of glycidyl methacrylate, 96.5 g of hydroxyethyl acrylate, 2.3 g of methacrylic acid, 64.0 g of methyl acrylate and 2.3 g of allyl methacrylate was added to the flask via the addition pumps and ports simultaneously with an initiator mixture of 37.9 g of mineral spirits, 12.3 g of butyl acetate and 6.9 g of t-butyl peroctoate. The monomer mixture and the initiator mixture were fed over 210 minutes. The reaction temperature was held at reflux at 89° C. to 93° C. throughout the polymerization process. The reaction mixture was held at reflux for additional 90 minutes, following the completion of the initiator mixture feed. A mixture of 0.2 g of Vazo® 67 initiator supplied by the DuPont Company, Wilmington, Del., 37.5 g of butyl acetate and 0.2 g of dimethyl ethanol amine was then added over 5 minutes. The reaction mixture was held at reflux for an additional 120 minutes. Then, 109.7 g of solvent was then removed by distillation and the reaction mixture cooled to room temperature to yield polymer dispersion at weight solids of 60.5% and a Brookfield viscosity of 940 cps measured at 5 rpm using spindle number 3.

Example 7

To a 5-liter flask fitted with a heating mantle, addition pumps and ports, agitator, water condenser, and thermocouple 485.0 g of ethyl acetate, 295.6 g of butyl acetate and a portion of a monomer mixture (210 g) consisting of 616.1 g of 2-ethyl hexyl methacrylate, 308.0 g of isobornyl methacrylate, 924.1 g of butyl methacrylate, 205.4 g of hydroxy ethyl methacrylate and 46.5 g of ethyl acetate were added under agitation and heated to a reflux temperature of 89° C. to 93° C. To the flask 31.5 g of a 10% solution of bis(boron difluoro diphenyl glyoximato) cobaltate (II) in ethyl acetate and a portion of an initiator solution (16.5 g) consisting of 48.1 g of Vazo® 52 initiator supplied by the DuPont Company, Wilmington, Del. and 451.8 g of ethyl acetate were added as a shot. Thereafter, the remainders of the monomer mixture and the initiator solution were fed to the flask. The monomer mixture was fed over 180 minutes and the initiator mixture was fed over 330 minutes. The reaction temperature was held at reflux at 89° C. to 93° C. throughout the polymerization process. The reaction mixture was held at reflux for additional an 30 minutes, following the completion of the initiator mixture feed. A mixture of 1.0 g of t-butyl peroctoate, 65.6 g of ethyl acetate and 48.5 g of butyl acetate was then added as a shot and the reaction mixture held at reflux for an additional 30 minutes. Upon cooling, the reaction mixture to room temperature yielded a solution of polymer having weight solids of 58% and a Brookfield viscosity of 640 cps measured at 5 rpm using spindle number 3. The number average molecular weight of the resulting polymer was 9015 and weight average molecular weight was 17820, both as determined by gel permeation chromatography using polystyrene as standard.

Example 8 (Comparative)

To a 5-liter flask fitted with a heating mantle, addition pumps and ports, agitator, water condenser, and thermocouple 1272 g of Macromonomer of Example 7, 252.9 g of mineral spirits, 670.3 g of heptane, 22.1 g of ethyl acetate and 0.02 gm of dimethyl ethanol amine were added. The reaction mixture was agitated and heated to a reflux temperature of 85° C. to 89° C. A monomer mixture of 171.1 g of styrene, 477.1 g of methyl methacrylate, 215.5 g of glycidyl methacrylate, 281.5 g of hydroxyethyl methacrylate, 6.7 g of methacrylic acid, 186.8 g of methyl acrylate, and 6.7 g of allyl methacrylate was simultaneously added to the flask via the addition pumps and ports with an initiator mixture of of 110.4 g of mineral spirits, 35.9 g of butyl acetate and 20.2 g of t-butyl peroctoate. The monomer and the initiator mixtures were fed over 210 minutes. The reaction temperature was held at reflux at 85° C. to 89° C. throughout the polymerization process. The reaction mixture was held at reflux for an additional 90 minutes, following the completion of the initiator mixture feed. Then, a mixture of 0.6 g of Vazo® 67 initiator supplied by the DuPont Company, Wilmington, Del., 92.8 g butyl acetate and 0.6 g of dimethyl ethanol amine was added over a period of 5 minutes. The reaction mixture was held at reflux for an additional 120 minutes and 320 g of solvent was then removed by distillation. Upon cooling to room temperature, the reaction mixture yielded a polymer solution having weight solids of 60.2% and a Brookfield viscosity of 580 cps (measured @5 rpm with #3 spindle).

Example 9

To a 2-liter flask fitted with a heating mantle, addition pumps and ports, agitator, water condenser, and thermocouple 166.3 g of ethyl acetate, 101.4 g of butyl acetate and a portion of a monomer mixture (72 g) consisting of 211.2 g of 2-ethyl hexyl methacrylate, 105.6 g of isobornyl methacrylate, 316.9 g of butyl methacrylate, 70.4 g of t-butyl aminoethyl methacrylate and 15.9 g of ethyl acetate were added under agitation and heated to a reflux temperature of 88° C. to 92° C. To the flask 14.1 g of a 10% solution of bis(boron difluoro diphenyl glyoximato) cobaltate (II) in ethyl acetate and a portion of an initiator solution (16.5 g) consisting of 13.3 g of Vazo® 52 initiator supplied by the DuPont Company, Wilmington, Del. and 154.9 g of ethyl acetate were added as a shot. Thereafter, the remainders of the monomer mixture and the initiator solution were fed to the flask. The monomer mixture was fed over 180 minutes and the initiator mixture was fed over 330 minutes. The reaction temperature was held at reflux at 88° C. to 92° C. throughout the polymerization process. The reaction mixture was held at reflux for additional 30 minutes, following the completion of the initiator mixture feed. A mixture of 0.3 g of t-butyl peroctoate, 22.5 g of ethyl acetate and 16.6 g of butyl acetate was then added as a shot and the reaction mixture held at reflux for an additional an 30 minutes. Upon cooling, the reaction mixture to room temperature yielded a solution of polymer having weight solids of 57.8% and Brookfield viscosity of 700 cps measured at 5 rpm using spindle number 3. The number average molecular weight of the resulting polymer was 5959 and weight average molecular weight was 11055, both as determined by gel permeation chromatography using polystyrene as standard.

Example 10

To a 2-liter flask fitted with a heating mantle, addition pumps and ports, agitator, water condenser, and thermocouple 157.1 g of butyl acetate and 356.1 g of macromonomer (example 9) were added. The solvent was agitated and heated to a reflux temperature of 99° C. to 104° C. A monomer mixture of 148.2 g of styrene, 49.4 g of butyl acrylate, 49.4 g of butyl methacrylate, 98.9 g of hydroxyethyl methacrylate, 148.3 g of isobornyl methacrylate and 3.43 g of butyl acetate was simultaneously added to the flask via the addition pumps and ports with an initiator mixture of 18.7 g of Vazo® 67 initiator supplied by the DuPont Company, Wilmington, Del. and 170.1 g butyl acetate. The monomer mixture was fed over 210 minutes and the initiator mixture was fed over 300 minutes. The reaction temperature was held at reflux at 104° C. to 110° C. throughout the polymerization process. The reaction mixture was held at reflux for an additional 30 minutes, following the completion of the initiator mixture feed and then cooled. The resulting polymer solution had weight solids of 59% and a Brookfield viscosity of 1680 cps (5 rpm). The number average molecular weight of the polymer was 6014 and the weight average molecular weight was 12933, as determined by gel permeation chromatography using polystyrene standard.

Example 11

To a 2-liter flask fitted with a heating mantle, addition pumps and ports, agitator, water condenser, and thermocouple 157.1 g of butyl acetate solvent and 356.1 g of macromonomer of Example 9 were added. The reaction mixture was agitated and heated to a reflux temperature of 99° C. to 104° C. A monomer mixture of 148.3 g of styrene, 49.4 g of butyl acetate, 39.6 g of butyl methacrylate, 98.9 g of hydroxyethyl methacrylate, 148.3 g of isobornyl methacrylate, 9.8 g of t-butylaminoethyl methacrylate, and 3.4 g of butyl acetate was simultaneously added to the flask via the addition pumps and ports with an initiator mixture of 18.7 g of Vazo® 67 initiator supplied by the DuPont Company, Wilmington, Del. and 170.1 g butyl acetate. The monomer mixture was fed over 210 minutes and the initiator mixture was fed over 300 minutes. The reaction temperature was held at reflux at 104° C. to 110° C. throughout the polymerization process. The reaction mixture was held at reflux for an additional 30 minutes, following the completion of the initiator mixture feed. Upon cooling the reaction mixture yielded a polymer solution having weight solids of 59.3% and a Brookfield viscosity of 2160 cps (5 rpm). The number average molecular weight of the polymer was 5914 and the weight average molecular a weight was 11956, as determined by gel permeation chromatography using polystyrene standard.

Paint Examples

Example 12

(Secondary amine containing acrylic polyol compared to standard acrylic polyol)

The following components in grams were added together to form a binder component of coating compositions:

|  | A (comparative) | B |
|---|---|---|
| Part I (Binder component) | | |
| acrylic polyol (Example 1 (Comparative)) | 110.91 | |
| secondary amine acrylic polyol (Example 2) | | 105.2 |
| butyl acetate | 16.34 | 16.74 |
| xylene | 16.34 | 16.74 |
| catalyst[1] | 1.79 | 1.78 |
| 10% acetic acid in butyl acetate | | 2.86 |
| Flow additive[2] | 1.88 | 1.88 |
| Part II (Crosslinking component) | | |
| Crosslinking agent[3] | 13.24 | 14.43 |
| butyl acetate | 4.75 | 5.18 |
| xylene | 2.85 | 3.11 |
| ethyl acetate | 1.90 | 2.07 |

[1]2% Dibutyl tin dilaurate in ethyl acetate
[2]50% Byk ® Flow additive in xylene supplied by BYK-CHEMIE, Wallingford, Connecticut.
[3]Tolonate ® HDT polyisocyanate supplied by supplied by Rhodia Inc., Cranbury, New Jersey.

Parts I and II were blended to form a pot mix of a clear coat composition with 42% solids and an ratio of NCO/(OH+ NH) of 1.03. The coatings from the pot mix were cast on glass, thermoplastic olefinic, and electrocoated steel panels to a cured film thickness of ~38 micrometers (~1.5 mils). The films were dried at room temperature. Pot mixes from both A (Comparative) and B had comparable potlifes. BK surface dry time for film from Comparative A (Comparative) was 61 minutes as compared to 33 minutes for B. The 30 day gel fractions of for A (Comparative) and B were good (91%) and the final film properties were comparable. From the foregoing, it is seen that the presence of secondary amine in the acrylic polyol in a binder component of a coating composition had a dramatic impact on film dry time with substantially no adverse impact on pot life or other film properties.

Example 13

The following components in grams were added together to form a binder component of coating compositions:

| Part I (Binder component) | |
|---|---|
| secondary amine acrylic polyol (GMA ethanol amine) (example 3) | 103.98 |
| butyl acetate | 17.34 |
| xylene | 17.34 |
| toluene | 1.88 |
| methyl ethyl ketone | 0.20 |
| catalyst[1] | 1.75 |
| Flow Additive[2] | 1.80 |

-continued

| | |
|---|---|
| Light Stabilizer[3] | 0.70 |
| UV Screener[4] | 0.73 |

[1] 2% Dibutyl tin dilaurate in ethyl acetate
[2] 50% Byk ® 306 Flow additive in xylene supplied by BYK-CHEMIE, Wallingford, Connecticut.
[3] Tinuvin ® 292 Light stabilizer supplied by Ciba Specialty Chemical Corp., Tarrytown, New York.
[4] Tinuvin ® 328 UV Screener supplied by Ciba Specialty Chemical Corp., Tarrytown, New York.

Part II (Crosslinking component)

| | |
|---|---|
| Crosslinking agent[1] | 14.13 |
| butyl acetate | 5.07 |
| xylene | 3.04 |
| ethyl acetate | 2.03 |

[1] Desmodur ® 3300 polyisocyanate supplied by Bayer Corporation, Pittsburgh, Pennsylvania.

Parts I and II were blended to form a pot mix of a clear coat composition with 42% solids and an ratio of NCO/(OH+NH) of 1.03. The coatings from the pot mix were cast on glass, thermoplastic olefinic, and electrocoated steel panels to a cured film thickness of ~51 micrometers (~2 mils). The films were dried at room temperature. The one-day swell ratio in methylene chloride was 1.6. BK surface dry time for film from the composition was 26 minutes and Persoz reading was 56 after 2 hours.

Example 14

The following components in grams were blended together to form a binder component of coating compositions:

Part I (Binder component)

| | |
|---|---|
| TBAEMA Resin (example 4) | 2177.4 |
| Acetone | 259.2 |
| Butyl Acetate | 168.4 |
| Methyl Ethyl Ketone | 140.5 |
| Methyl Isobuytl Ketone | 268.7 |
| Toluene | 145.5 |
| Light Stabilizer[1] | 16.8 |
| UV Screener[2] | 16.8 |
| Xylene | 21.3 |
| Flow Additive[3] | 21.3 |
| Xylene | 133.0 |
| T-Butyl Acetate | 513.0 |
| PE/MHHPA/EO[4] | 53.7 |
| Acetone | 37.6 |
| Acetic Acid | 4.2 |
| Ethyl Acetate | 41.0 |
| Dibutyl Tin Dilaurate | 0.8 |

[1] Tinuvin ® 292 Light stabilizer supplied by Ciba Specialty Chemical Corp., Tarrytown, New York.
[2] Tinuvin ® 328 UV Screener supplied by Ciba Specialty Chemical Corp., Tarrytown, New York.
[3] Byk ® 306 Flow additive in xylene supplied by BYK-CHEMIE, Wallingford, Connecticut.
[4] Made in accordance with Procedure No. 3 in a published PCT application WO99/23131, published on May 14, 1999, which is incorporated herein by reference.

Part II (Crosslinking component)

| | |
|---|---|
| Crosslinking Agent[1] | 401.7 |
| Butyl Acetate | 144.3 |
| Xylene | 86.6 |
| PM Acetate | 57.7 |
| Crosslinking Agent[2] | 101.1 |

[1] Tolonate ® HDT Polyisocyanate supplied by Rhodia Inc., Cranbury, New Jersey.
[2] Desmodur ® Z-4470BA Polyisocyanate supplied by Bayer Corporation, Pittsburgh, Pennsylvania.

Parts I and II were blended to form a pot mix of a clear coat composition with 34.8% solids and an ratio of NCO/(OH+NH) of 1.1. The potmix had an acceptable pot life of 60 minutes. The coatings from the pot mix were cast on electrocoated steel panels to a cured film thickness of ~61 micrometers (~2.4 mils). The films were cured under ambient conditions. The resulting coating had Persoz hardness of 97 at 2 hours, was water spot free by 30 minutes, had a BK 3 surface dry time of 35 minutes, and achieved a five-hour swelling ratio in methylene chloride of 1.86. Thus, it can be clearly seen that the coating from the coating composition of the present invention rapidly dried and cured, thus providing a very high productivity while still producing a coating that had excellent properties.

The clearcoat from the pot mix was also sprayed over a previously prepared primed and basecoated substrate. After ambient curing for 2 hours and 15 minutes, the clearcoat could be wet sanded with 1500 grit sandpaper, thus, clearly showing that the clearcoat was cured to a point to allow buffing and sanding.

Example 15

The following components in grams were blended together to form a binder component of coating compositions:

Part I (Binder component)

| | |
|---|---|
| Branched TBAEMA acrylic polyol (Example 11) | 90.42 |
| butyl acetate | 7.74 |
| methyl isobutyl ketone | 12.34 |
| toluene | 7.92 |
| acetone | 11.91 |
| methyl ethyl ketone | 7.69 |
| Catalyst[1] | 1.69 |
| Flow Additive[2] | 1.72 |
| Light Stabilizer[3] | 1.00 |
| UV Screener[4] | 0.98 |
| Acetic acid | 0.27 |

[1] 2% dibutyl tin dilaurate in ethyl acetate
[2] 50% Byk 306 in xylene Flow additive in xylene supplied by BYK-CHEMIE, Wallingford, Connecticut.
[3] Tinuvin ® 292 Light stabilizer supplied by Ciba Specialty Chemical Corp., Tarrytown, New York.
[4] Tinuvin ® 328 UV Screener supplied by Ciba Specialty Chemical Corp., Tarrytown, New York.

Part II (Crosslinking component)

| | |
|---|---|
| Crosslinking agent[1] | 13.86 |
| butyl acetate | 3.51 |
| xylene | 2.51 |
| toluene | 3.01 |
| propylene glycol monomethylether acetate | 1.00 |

[1] Desmodur ® 3300 Polyisocyanate supplied by Bayer Corporation, Pittsburgh, Pennsylvania.

Parts I and II were blended to form a pot mix of a clear coat composition with 42% solids and an ratio of NCO/(OH+NH) of 1.03. The coatings from the pot mix were cast on glass, thermoplastic olefinic, and electrocoated steel panels to a cured film thickness of ~51 micrometers (~2 mils). The films were cured under ambient conditions. The one-day swell ratio in methylene chloride was 1.8. BK surface dry time for film from the composition was 38 minutes and a Persoz reading of 51 after 2 hours. Thus, it can be clearly seen that the coating from the coating composition of the present invention rapidly dried and cured, thus providing a very high productivity while still producing a coating that had excellent properties.

Example 16

|  | C (Comparative) | D |
|---|---|---|
| Part I |  |  |
| Hydroxyl NAD (Comparative Example 8) | 103.55 |  |
| TBAEMA NAD (Example 6) |  | 101.13 |
| butyl acetate | 40.22 | 40.58 |
| toluene | 1.58 | 1.58 |
| methyl ethyl ketone | 1.58 | 1.58 |
| Catalyst[1] | 0.73 | 0.73 |
| Flow Additive[2] | 1.86 | 1.86 |
| Light stabilizer[3] | 1.08 | 1.08 |
| UV Screener[4] | 1.06 | 1.06 |
| Acetic acid | 0.29 | 0.29 |

[1] 2% dibutyl tin dilaurate in ethyl acetate.
[2] 50% Byk 306 in xylene Flow additive in xylene supplied by BYK-CHEMIE, Wallingford, Connecticut.
[3] Tinuvin ® 292 Light stabilizer supplied by Ciba Specialty Chemical Corp., Tarrytown, New York.
[4] Tinuvin ® 328 UV Screener supplied by Ciba Specialty Chemical Corp., Tarrytown, New York.

Part II (Crosslinking component)

| Crosslinking agent1 | 10.47 | 11.67 |
|---|---|---|
| butyl acetate | 2.65 | 2.96 |
| xylene | 1.90 | 2.11 |
| toluene | 2.27 | 2.54 |
| propylene glycol monomethylether acetate | 0.76 | 0.85 |

[1] Desmodur ® 3300 polyisocyanate supplied by Bayer Corporation, Pittsburgh, Pennsylvania.

Parts I and II were blended to form a pot mix of a clear coat composition with 50% solids and an ratio of NCO/(OH+ NH) of 1.03. The coatings from the pot mix were cast on glass, thermoplastic olefinic, and electrocoated steel panels to a cured film thickness of ~51 micrometers (~2 mils). The films were cured at room temperature. BK surface dry time for the films from the composition C (Comparative) and D was 26 minutes and 14 minutes, respectively for comparatively similar Persoz readings for 35 for C (Comparative) and 36 for D. From the foregoing, the presence of secondary amine in the acrylic polyol in a binder component of a coating composition had a dramatic impact on film dry time with substantially no adverse impact on pot life or other film properties.

We claim:

1. A method of producing a coating on a substrate, said method comprising:

mixing a binder component and a crosslinking component of a two-stage cure coating composition to form a pot mix, wherein said binder component comprises an acrylic polymer having in the range of from 5.0 weight percent to 70.0 weight percent of hydroxyl moieties and in the range of from 0.5 weight percent to 8.0 weight percent of secondary amine moieties, all percentages based on the weight of binder component solids; and wherein said crosslinking component comprises a crosslinking agent having at least two isocyanate groups;

applying a layer of said pot mix over said substrate;

first stage curing said layer, wherein said layer has a Persoz hardness of at least 30 within 2 hours after said application;

second stage curing said first stage cured layer into said coating on said substrate.

2. A coating on said substrate produced in accordance with the method of claim 1.

3. The method of claim 1 wherein said substrate is an automotive body.

* * * * *